G. MOORE.
FILTER.
APPLICATION FILED DEC. 11, 1914.
1,296,685.
Patented Mar. 11, 1919.
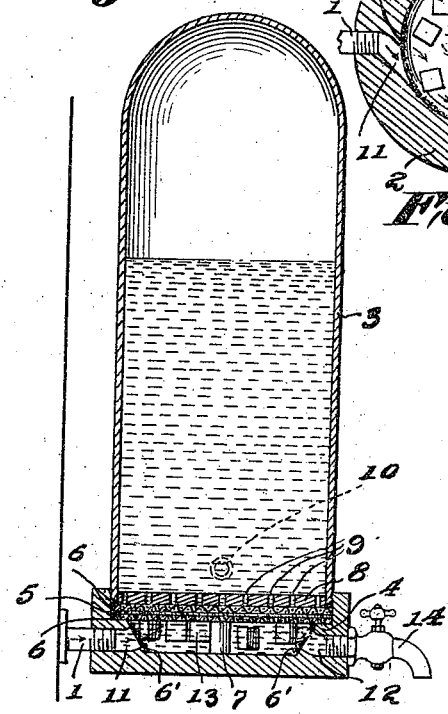
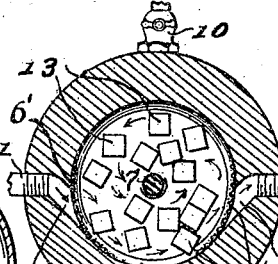
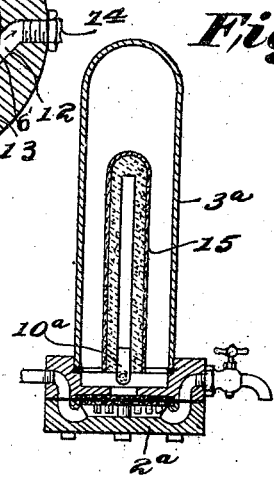
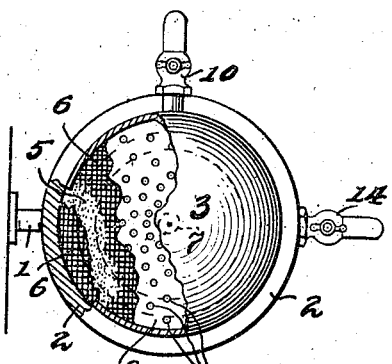
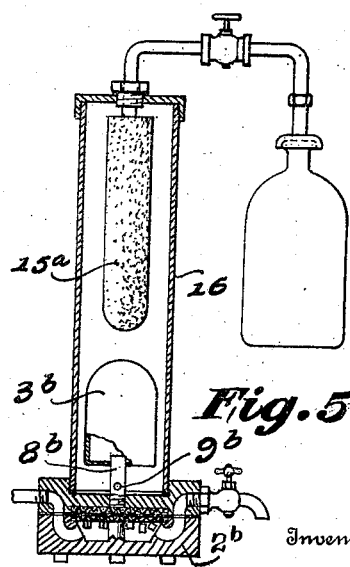
Witnesses
H. N. Lybrand
M. H. Delaney
Inventor:
George Moore,
By Edgar M. Kitchin
Attorney

UNITED STATES PATENT OFFICE.

GEORGE MOORE, OF JOPLIN, MISSOURI.

FILTER.

1,296,685.  Specification of Letters Patent.  Patented Mar. 11, 1919.

Application filed December 11, 1914. Serial No. 876,743.

*To all whom it may concern:*

Be it known that I, GEORGE MOORE, a citizen of the United States, residing at Joplin, in the county of Jasper and State of Missouri, have invented certain new and useful Improvements in Filters; and I do hereby declare the following to be a full, clear, and exact description of the invention, such as will enable others skilled in the art to which it appertains to make and use the same.

This invention relates to improvements in filters and particularly to the type adapted for the purification of liquids.

The primary object in view is the provision of means for automatic cleansing of filtering material in an effective manner and to remove the clogging matter from the filter so the flow will not be stopped.

With this and other objects in view, as will in part hereinafter be stated and in part become apparent, the invention comprises certain novel constructions, combinations and arrangements of parts as will subsequently more fully appear and be pointed out in the claim.

In the accompanying drawing:

Figure 1 is a longitudinal, vertical, central section through a filter embodying the features of the present invention.

Fig. 2 is a plan view thereof, with parts broken away to show lower parts.

Fig. 3 is a cross section through the container on the plane of the intake and outlet.

Figs. 4 and 5 are views similar to Fig. 1 of modified embodiments.

Referring to the drawing by numerals, 1 indicates a supply pipe for water or other fluid to be filtered. It is to be understood that the term "water" is employed herein to signify any such fluid. A preferably annular container 2 is connected to pipe 1, and is provided with an upstanding air dome or chamber 3, the dome being open only at its lower end and threaded into or otherwise fixed to the container 2. An annular, inwardly projecting shoulder 4 is formed in container 1, and a filter is clamped between said shoulder and the lower end of dome or tube 3. Said filter consists of a filter fabric or sheet 5 confined and protected at each side by wire mesh 6. An upstanding stay 7 is disposed centrally of container 2 to aid in preventing sagging of the filter. A disk plate 8 is threaded or otherwise secured in the lower end of dome 3 in position for engaging the upper face of the filter and preventing upward movement thereof. Apertures 9 formed in disk 8 admit filtered water to dome 3, and a spigot or other appropriate valve 10 controls discharge of filtered water from dome 3.

A passageway 11 is formed in container 2 to receive the supply from pipe 1 and to deliver the water to the chamber of the container. Passageway 11 is curved upwardly toward the filter, as seen in Fig. 1, and inclined laterally as seen in Fig. 3, to throw its stream at one side of the chamber, so as to produce a whirling movement of the contained water, and to cause the water to wash the under or approach surface of the filter. To aid in the whirling movement and to increase the cleansing action by attrition, the outlet 12 is arranged substantially diametrically opposite intake 11, with the passageway of the outlet curved downwardly from beneath the filter, as seen in Fig. 1, and also inclined laterally as seen in Fig. 3.

Within the chamber of container 2 are arranged particles of solids 13, 13, preferably in the form of wood or other buoyant solids, although sand or other foreign solids adapted to increase the scrubbing action on the under or approach face of the filter may be employed.

A spigot or other valve 14 controls discharge from outlet 12, and, in operation, when valves 10 and 14 are closed, water will be forced through the filtering medium up into dome or pipe 3 until the air therein is compressed to an extent equalizing the pressure of the water supply. A supply of filtered water is thus always ready at hand, and may be drawn through spigot 10. When, however, water is to be drawn merely for toilet or household use which does not require to be filtered, spigot 14 is opened, and, thereupon, filtered water from dome 3 is forced downward through the filtering medium by the expanding force of the compressed air which action is permitted by the relief of the pressure of the water supply as long as the spigot 14 is left open. As soon as it is closed, the restoration of normal pressure in container 1 causes the filtering action to begin again and to continue until the equilibrium is again reached in dome 3. This reverse flow of water acting in conjunction with the attrition of the water and solids 13 dislodge the accumulated matter from the underneath surface of the filter medium, and such matter is carried away through spigot 14.

In Fig. 4, a slightly modified embodiment is seen in which the container $2^a$ is divided into two sections, and is otherwise substantially identical with container 2. A dome $3^a$ is carried by the container above the filtering medium, and operates the same as dome 3. Instead of discharging directly from the dome, the water is refiltered through a filter 15 to a pipe $10^a$ leading to a spigot similar to spigot 10 but not illustrated. Filter 15 may be of any of various types but preferably consists of a shell of burned clay bearing an external coat of filtering material, such as fullers' earth or charcoal. The operation is the same as described, except that the filtered water is discharged through a second filter, and when the counter or reverse current is produced by drawing raw, that is, unfiltered, water, such current is formed of filtered water surrounding filter 15 but not within the same.

In Fig. 5 is shown a further embodiment in which container $2^b$ like container $2^a$ is employed and is provided with a tube 16 in the upper portion of which is arranged the secondary filter $15^a$ identical in structure and function with filter 15. Tube 16 does not serve as an air chamber since the discharge is through the upper portion thereof, but instead a supplemental dome $3^b$ is arranged in tube 16 and communicates by pipe $8^b$ with the upper surface of the primary filter; that is, the filter in container $2^b$. Dome $3^b$ is sealed, and pipe $8^b$ has an aperture $9^b$ communicating with tube 16. The operation should be obvious, being the same as described except that the air is compressed in dome $3^b$ instead of in tube 16, and the counter current is produced therefore from the expansion of air in dome $3^b$ when the pressure is relieved by the drawing of raw water from container $2^b$.

The wire mesh 6 both serves to hold the filtering fabric in position and to prevent wear thereof. Similar mesh 6' is disposed across the intake and discharge to guard the same against clogging.

What I claim is:

In a filter, the combination of a container, a supply chamber and a substantially disk-shaped filtering medium interposed between the container and said supply chamber and controlling communication therebetween, the container being arranged for creating and maintaining pneumatic pressure on liquid entering the container from the supply chamber through said filtering medium tending to force said liquid back through the filtering medium, the filtering medium being disposed substantially horizontally at the upper surface of liquid contained in the supply chamber, means for supplying liquid to said supply chamber in a tangentially directed stream, a scrubbing solid of buoyant material arranged in said supply chamber and adapted to be moved in contact with said filtering medium during the inflow of liquid to be filtered, means for controlling delivery of liquid directly from said container, and means for controlling delivery of liquid from said supply chamber adapted when effecting such delivery to relieve pressure in the supply chamber and allow reverse discharge of filtered liquid from the container through the filtering medium, a tangentially disposed outlet passageway in form to communicate with said delivery controlling means for the supply chamber.

In testimony whereof I affix my signature in presence of two witnesses.

GEORGE MOORE.

Witnesses:
L. H. MOORE,
E. G. HOAG.